United States Patent [19]

Leong

[11] 4,348,985
[45] Sep. 14, 1982

[54] ANIMAL INHALATION EXPOSURE SYSTEM

[75] Inventor: Basil K. J. Leong, Kalamazoo, Mich.

[73] Assignee: The Upjohn Company, Kalamazoo, Mich.

[21] Appl. No.: 199,420

[22] Filed: Oct. 22, 1980

[51] Int. Cl.³ .............................................. A01K 1/03
[52] U.S. Cl. ...................................................... 119/15
[58] Field of Search ............................. 119/15, 16, 21

[56] References Cited

U.S. PATENT DOCUMENTS

| | | | |
|---|---|---|---|
| 3,367,308 | 2/1968 | Quattrone et al. | 119/15 |
| 3,464,388 | 9/1969 | Stout | 119/15 |
| 3,557,756 | 1/1971 | Ramsey | 119/15 |
| 3,718,118 | 2/1973 | Bibler | 119/16 |
| 4,216,741 | 8/1980 | Moss | 119/15 |

*Primary Examiner*—Hugh R. Chamblee

*Attorney, Agent, or Firm*—Blanchard, Flynn, Thiel, Boutell & Tanis

[57] ABSTRACT

An animal inhalation exposure system includes a rectangular exposure chamber, a test atmosphere source communicating with one internal chamber corner through an inlet conduit, and a vacuum source communicating with the diagonally opposite internal chamber corner through an outlet conduit. The said conduits are oriented so that the test atmosphere flows diagonally downwardly through the chamber, the portions of the chamber walls adjacent the inlet and outlet conduits, respectively, facilitating uniform and non-turbulent divergence and convergence of the test atmosphere. Test animal cages with horizontal excreta pans are preferably stacked in the chamber in offset horizontal tiers which define a plane substantially normal to the test atmosphere flow. A holding chamber shares a common wall with the exposure chamber and at least one closable opening is provided in the common wall for transfer of test animals between the chambers.

16 Claims, 10 Drawing Figures

ANIMAL INHALATION EXPOSURE SYSTEM

FIELD OF THE INVENTION

This invention relates in general to an animal inhalation exposure system and, more particularly, to such a system in which a number of animals housed in a single chamber are exposed, preferably uniformly, to toxic aerosols to determine the effects thereof.

BACKGROUND OF THE INVENTION

Research in inhalation toxicology often requires that test animals be exposed for extended periods of time to carefully controlled test atmospheres which contain known concentrations of test contaminants. A variety of animal exposure chambers are known to exist in the prior art, but they have not proved satisfactory in all respects for applicant's purposes.

Typically, a plurality of animals is placed in a single exposure chamber into which a test atmosphere is discharged. The animals are preferably placed in separate cages which are often stacked vertically. Thus a substantially horizontal catch pan is usually provided beneath each cage to protect the animals in lower cages from the excreta of the animals in the cages thereabove. A persistant problem, however, is that the catch pans can interfere with, and even obstruct, the delivery of the test atmosphere to the test animals where the flow of test atmosphere is from top to bottom. Various methods have been developed to minimize the adverse effects of the catch pans, but no solution has been entirely satisfactory.

One approach to the problem, as disclosed for example in U.S. Pat. Nos. 3,302,615 and 4,201,154, utilizes an inhalation chamber in which a plurality of animal cages are suspended from a mechanism which slowly and continuously moves the cages along a predefined path within the chamber. Such systems, however, are complex and expensive to manufacture and maintain, and are too large and heavy to be easily moved from one location in the lab to another.

Another approach to the problem, disclosed for example in U.S. Pat. No. 4,216,741, utilizes an exposure chamber having a pyramidal or conical top and bottom and in which the test atmosphere is introduced at the apex of the top and is withdrawn adjacent the apex of the bottom, such that the general flow of the test atmosphere through the chamber is vertically downward. The horizontal catch pans are positioned within the chamber so that the barrier effect thereof induces turbulence in the test atmosphere flow which is intended to uniformly distribute the test atmosphere to the test animals. Although the pyramidal or conical surfaces are functionally beneficial, in that they facilitate a uniform and non-turbulent divergence and convergence of the test atmosphere entering and leaving the chamber, the fact that they are separate elements having a unique shape increases the manufacturing cost, complexity and height of the system. Further, the dependence of the design on the barrierlike effect of the catch pans limits the extent to which cages and the associated catch pans can be removed from the system without degrading the system operation.

Another prior art approach is to provide an exposure chamber having opposite side walls which are pyramidal or conical with horizontally outwardly extending apexes and having a test atmosphere inlet at one apex and a test atmosphere outlet at the other apex. The flow of the test atmosphere therethrough is thus generally horizontal, and passes smoothly across the catch pans in a direction parallel to the catch pans. Such systems have also proved to be less than entirely satisfactory, in part because of the effect of gravity on the dust components of certain test atmospheres which limit the extent to which the distribution of the test atmosphere is vertically uniform, and also tends to induce a buildup of dust in the bottom of the chamber. These systems are bulky and require large spaces. An additional disadvantage present in many of the prior art devices, including the system disclosed in U.S. Pat. No. 4,216,741 and discussed above, is that insufficient protection from the contamination is provided for the system operator during transfers of the contaminated animals from the exposure chamber to regular animal housing facilities.

Accordingly, it is an object of this invention to provide an animal inhalation exposure apparatus in which a single exposure chamber houses a number of animals in cages having substantially horizontal excreta trays therebelow and in which a substantially uniform distribution of the test atmosphere to the test animals is effected with a minimal disturbance of the test atmosphere flow.

It is a further object of the invention to provide an animal inhalation exposure apparatus, as aforesaid, wherein the test animals may be transferred between the exposure chamber and a regular animal housing facility by a system operator without exposing the system operator to a contamination hazard.

It is a further object of the invention to provide an animal inhalation exposure apparatus, as aforesaid, which permits generation of the test atmosphere in situ without exposing the system operator to a contamination hazard.

It is a further object of the invention to provide an inhalation exposure apparatus, as aforesaid, in which the exposure chamber has a shape which is simple and inexpensive to construct, but which has divergent and convergent surfaces respectively adjacent the test atmosphere inlet and outlet to facilitate the uniform distribution and flow of the test atmosphere through the exposure chamber.

It is a further object of the invention to provide an inhalation exposure apparatus, as aforesaid, which is mobile and which has a filtering system for removing toxic components from the test atmosphere exhausted from the chamber.

SUMMARY OF THE INVENTION

The objects and purposes of the invention, including those set forth above, are met by providing a substantially rectangular exposure chamber having an inlet conduit communicating with the interior of the chamber adjacent one corner thereof and an outlet conduit communicating with the interior of the chamber adjacent the corner which is diagonally opposite the corner with the inlet conduit. A test atmosphere source communicates with the inlet conduit for supplying a test atmosphere to the exposure chamber, and a vacuum source communicates with the outlet conduit for withdrawing the test atmosphere from the chamber. The said conduits are oriented so that the test atmosphere flows generally diagonally downwardly through the chamber from the inlet conduit to the outlet conduit. The three converging chamber walls adjacent the inlet conduit facilitate uniform and non-turbulent divergence of the test atmosphere entering the chamber and the three converging chamber walls adjacent the outlet conduit facilitate a uniform and non-turbulent convergence of the test atmosphere into the outlet conduit. A filter may be connected between the outlet conduit and the vacuum source for decontaminating the test atmosphere withdrawn from the chamber. A plurality of cages in the exposure chamber hold the test animals, each cage having a substantially horizontal pan thereunder for collecting excreta from the test animals. The cages are preferably stacked in horizontal tiers which are slightly offset horizontally with respect to each other so that the geometric centers of the cages define a plane substantially normal to a line extending between the inlet conduit and the outlet conduit, thereby minimizing the disruption of the flow of the test atmosphere by the catch pans. A holding chamber is provided adjacent the exposure chamber and shares a common wall therewith, and openings are provided in the walls of both chambers to facilitate transfer of the test animals between the holding chamber and exposure chamber. Closure members are provided for sealing the openings and are adapted to open inwardly into the exposure chamber and holding chamber to minimize contamination of the adjacent areas. A housing which communicates with the vacuum source is preferably provided around the test atmosphere source, and a negative pressure is maintained inside the exposure chamber and the housing by the vacuum source to minimize the possibility that toxic components of the test atmosphere will escape through cracks or the openings and contaminate the ambient air external to the housing and exposure chamber.

BRIEF DESCRIPTION OF THE DRAWINGS

Other objects, purposes and advantages of this invention will be apparent to persons acquainted with apparatus of this general type upon reading the following specification and inspecting the accompanying drawings, in which.

Figure 1:
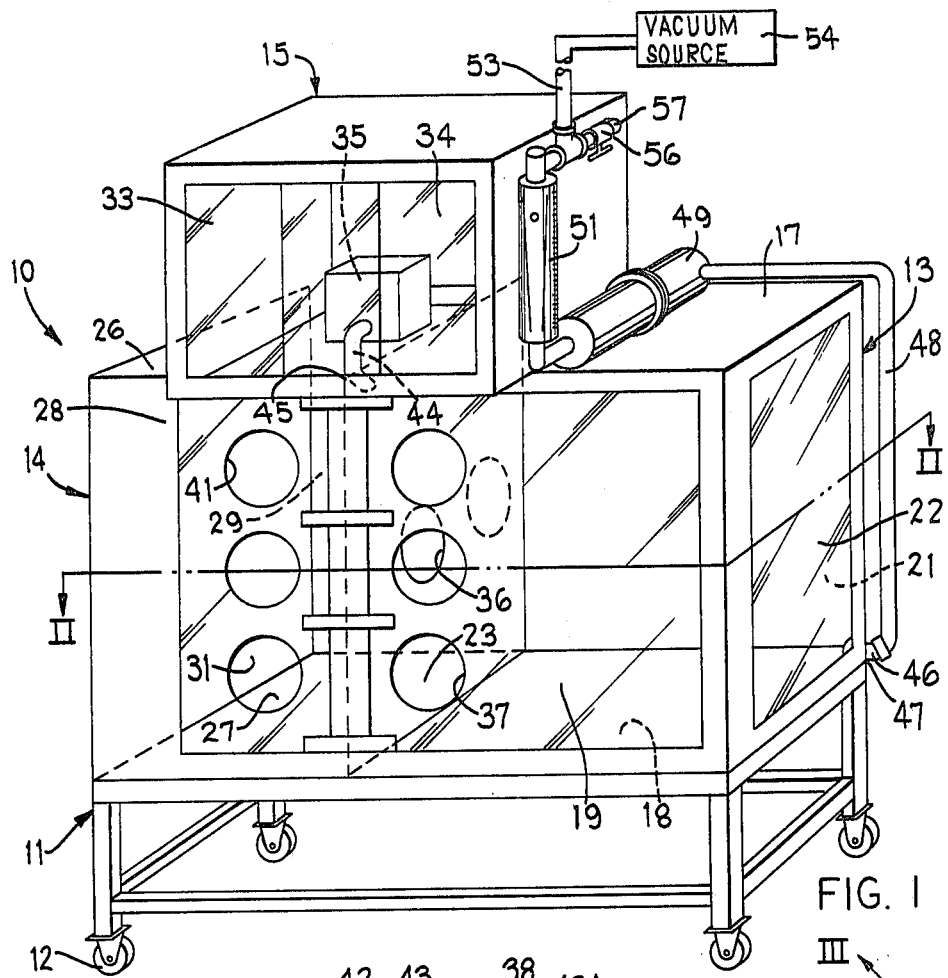
FIG. 1 is a perspective view of a preferred embodiment of an animal inhalation exposure apparatus embodying the present invention.

Certain terminology will be used in the following description for convenience in reference only and will not be limiting. The words "up", "down", "front" and "rear" will have reference to the animal inhalation exposure apparatus as appearing in the drawings and according to the detailed description which follows. The words "in" and "out" will refer to directions toward and away from, respectively, the geometric center of the apparatus and designated parts thereof. Such terminology will include the words specifically mentioned, derivatives thereof, and words of similar import.

DETAILED DESCRIPTION

FIG. 1 illustrates an animal inhalation exposure system 10 which is supported by a table 11 having casters 12 to facilitate mobility of the exposure system 10. The exposure system 10 comprises a rectangular exposure chamber 13, a holding chamber 14 and an atmosphere generator housing 15.

The exposure chamber 13 is preferably cubical and comprises a top wall 17, a bottom wall 18, a front wall 19, a rear wall 21, a side wall 22 and a side wall 23. The edges of the chamber may be, for example, about three feet long.

The holding chamber 14 is contiguous with the exposure chamber 13 so that the side wall 23 of the exposure chamber 13 defines a common wall therebetween. The remaining sides of the holding chamber 14 are defined by a side wall 31, which is spaced from and parallel to the common side wall 23, a top wall 26, bottom wall 27, front wall 28 and rear wall 29. If desired, one or more of the walls can be entirely or partly transparent, such as walls 19, 22 and 28 of FIG. 1.

The atmosphere generator housing 15 is provided above the exposure chamber 13 and holding chamber 14 and rests partly on both. The housing 15 has a generally rectangular shape and preferably overhangs slightly the respective front walls 19 and 28 of the exposure and holding chambers 13 and 14. A pair of transparent doors 33 and 34 are slidably supported in the front of the housing 15. The doors 33 and 34 are preferably loose-fitting in order to allow air to be drawn past the edges thereof into the housing 15. A test atmosphere generator 35 (FIG. 1) is provided in the housing 15. The generator 35 may be any of several types of atmosphere generators, so that detailed discussion thereof is not believed necessary to a complete understanding of the present invention. The generator 35 is preferably a dust generator, such as the one disclosed in a copending application entitled "Dust Generator", assigned to the assignee of the present application and filed on or about Oct. 8, 1980.

Figure 2:
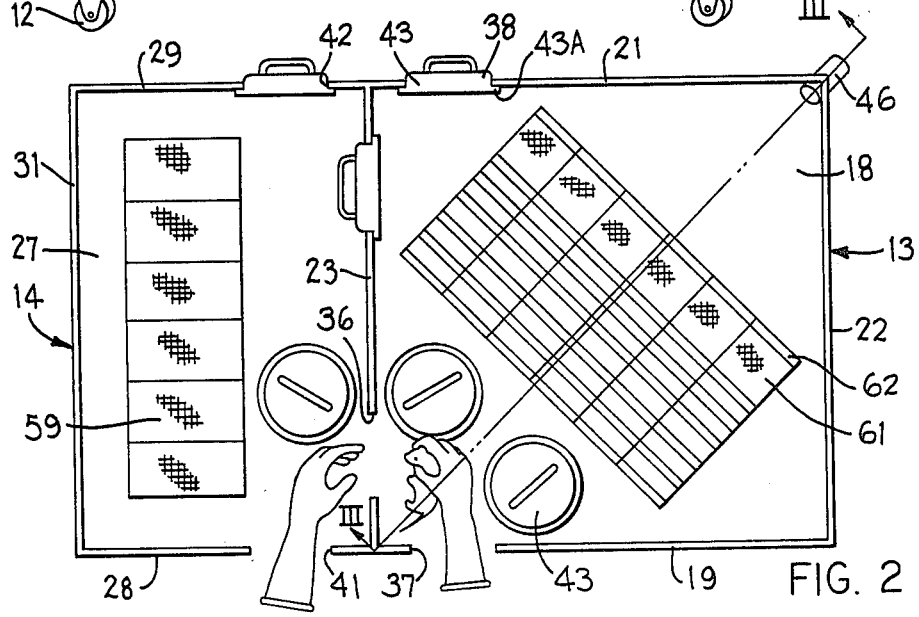
FIG. 2 is a sectional view taken along the line II—II of FIG. 1.

As shown in FIGS. 1 and 2, at least one transfer opening 36 is provided in the wall 23 which is common to the exposure and holding chambers 13 and 14. Similarly, arm openings 37, 38, 41 and 42 are respectively provided in the walls 19, 21, 28 and 29 of the exposure and holding chambers 13 and 14. A circular closure member 43 is provided for each of the openings 36, 37, 38, 41 and 42, and is diametrically dimensioned so as to be snugly received within the opening. Each closure member 43 has an annular flange 43A which prevents the closure member 43 from being pulled entirely through the corresponding arm opening. In particular, the flanges 43A of the closure members 43 for the openings 36, 37 and 38 are disposed on the inside of the exposure chamber 13 to ensure that these closure members 43 always open inwardly, thereby eliminating the risk that toxic material clinging to these closure members 43 might be removed from the exposure chamber 13.

As shown in FIG. 1, an inlet conduit 44 communicates with the interior of the exposure chamber 13 at an upper front corner 45 thereof and extends into the atmosphere generator housing 15 where it is connected to the atmosphere generator 35.

An outlet conduit 46 communicates with the interior of the exposure chamber 13 at a corner 47 which is diagonally opposite and remote from the corner 45. The outlet conduit 46 is connected to a pipe 48 which in turn is connected to a filtering unit 49 mounted on the top wall 17 of the exposure chamber 13. The filtering unit 49 may be of a convenient type, but preferably has a four-layer filter in which gasses successively pass through a layer of fiberglass, a layer of polymer foam, a layer of filter paper and a layer of activated charcoal.

An air flow meter 51 of convenient construction is connected to the outlet of the filtering unit 49, and indicates the volume of the test atmosphere flowing through the exposure chamber 13. The outlet of the meter 51 is connected by a pipe 53 to a conventional vacuum source 54. The pipe 53 is connected by a pipe 57 to the interior of the housing 15. A valve 56 is provided in the pipe 57 to control the flow of air therethrough.

Figure 3:
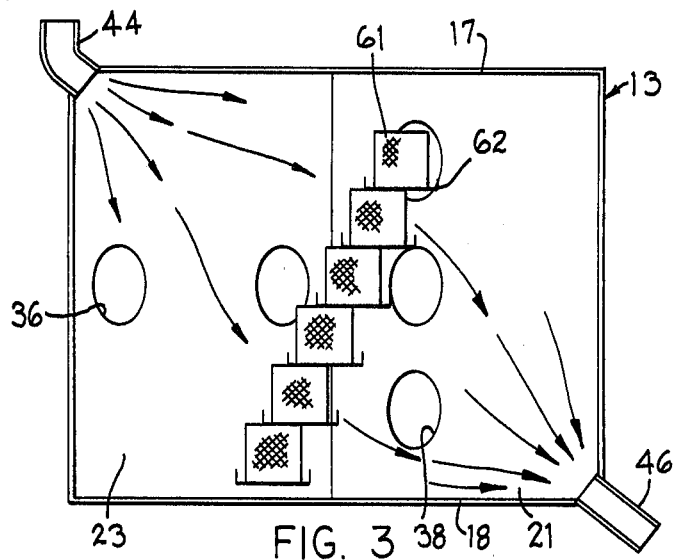
FIG. 3 is a sectional view taken along the line III—III of FIG. 2.

As shown in FIG. 2, a plurality of holding cages 59 for the test animals are provided in the holding chamber 14, and a plurality of exposure cages 61 are provided for the test animals in the exposure chamber 13, each cage having a horizontal catch pan 62 (FIGS. 2 and 3) thereunder to collect excreta. As shown in FIGS. 2 and 3, the cages 61 are stacked in horizontal tiers, each horizontal tier extending in a direction substantially perpendicular to a diagonal line connecting the corners 45 and 47 of the chamber 13. Although the horizontal tiers may be stacked vertically so that each is directly above the horizontal tier supporting it, they are preferably stacked with each horizontal tier slightly horizontally offset from the tier supporting it, as illustrated in FIGS. 2 and 3, such that the geometric centers of all the cages 61 define a plane which is substantially perpendicular to the diagonal line connecting the corners 45 and 47 and defines an acute angle with respect to the bottom wall 18 of the chamber 13.

Figure 6:
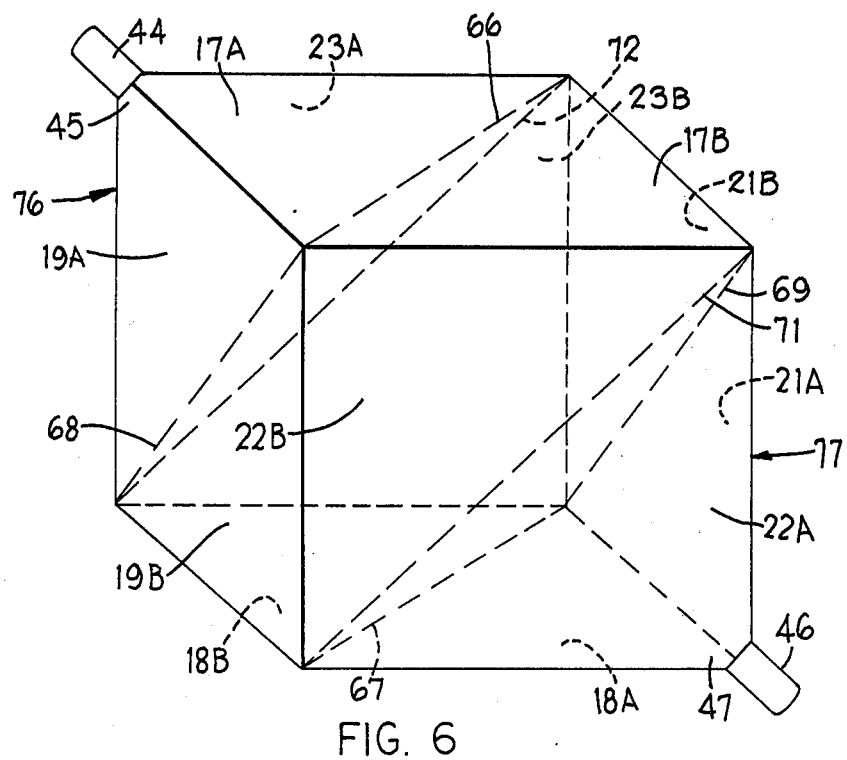
FIG. 6 is a different perspective view of the exposure chamber of FIG. 4.
Figure 4:
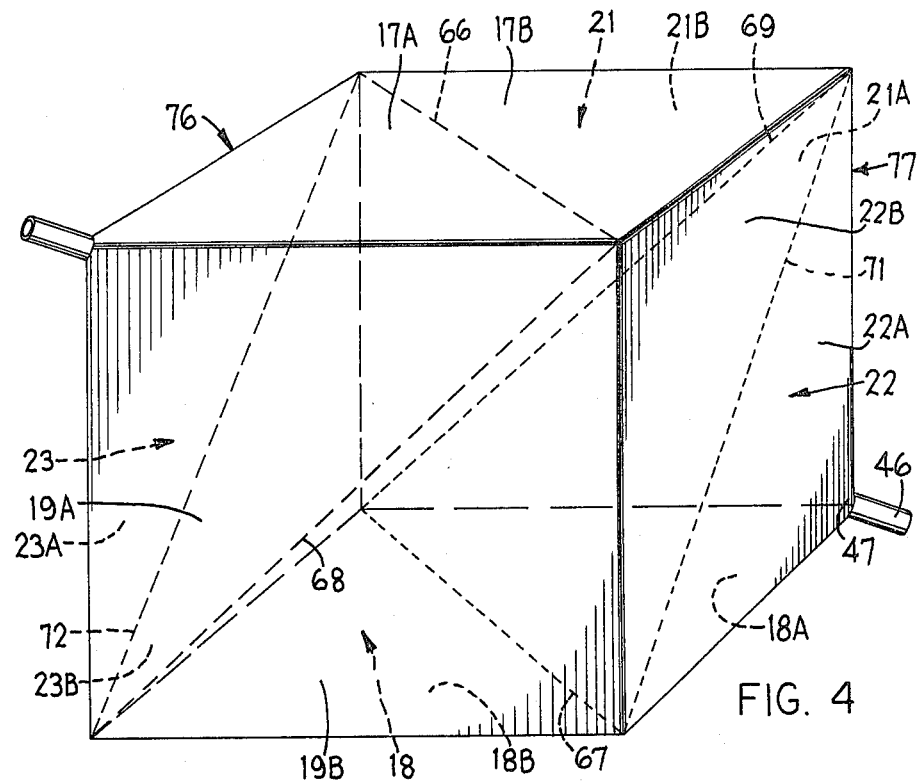
FIG. 4 is a perspective view schematically illustrating the exposure chamber of the apparatus of FIG. 1.
Figure 5:
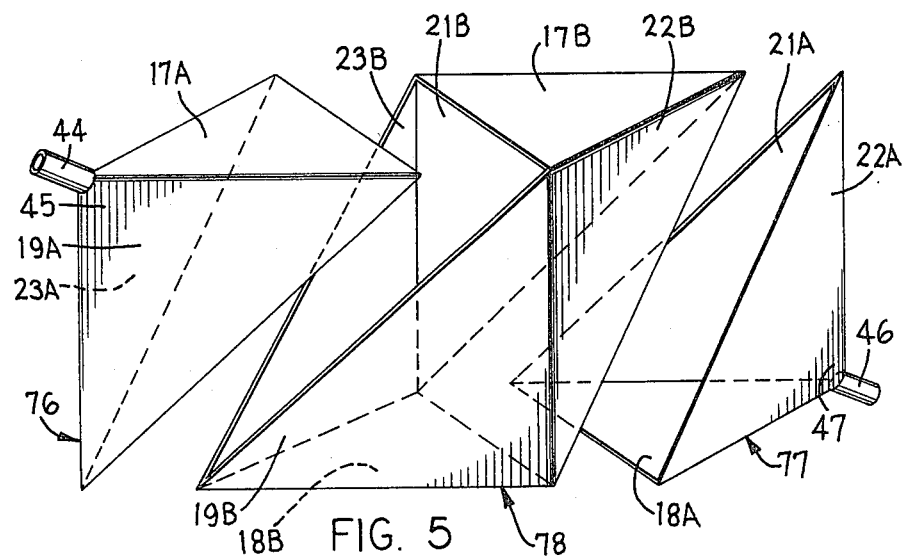
FIG. 5 is an exploded view of the exposure chamber of FIG. 4.

As shown in FIGS. 4 and 6, the front wall 19 of the exposure chamber 13 may be conceptually visualized as comprising two triangular portions 19A and 19B which lie on opposite sides of a broken line 68 which diagonally bisects the front wall 19. In a similar manner, broken lines 66, 67, 69, 71 and 72 respectively bisect the walls 17, 18, 21, 22 and 23 to respectively define top wall portions 17A and 17B, bottom wall portions 18A and 18B, rear wall portions 21A and 21B, side wall portions 22A and 22B, and side wall portions 23A and 23B. If the portions A and B of each of the walls 17, 18, 19, 21, 22 and 23 were separated from each other along the respective broken lines 66, 67, 68, 69, 71 and 72, the exposure chamber 13 would appear in the manner illustrated in FIG. 5. It should be emphasized that FIG. 5 is intended as a conceptual aid to an understanding of the operation of the exposure chamber 13, and that proper operation of the exposure chamber 13 does not require that the walls of the chamber 13 actually be respectively separable along the broken lines 66, 67, 68, 69, 71 and 72.

The wall portions 17A, 19A and 23A (FIG. 5) define a three-sided regular pyramidal surface 76 having a base perimeter which is an equilateral triangle and having the inlet conduit 44 at the apex thereof. Similarly, the wall portions 18A, 21A and 22A define a three-sided regular pyramidal surface 77 having a base perimeter which is an equilateral triangle and having the outlet conduit 46 at the apex thereof. The wall portions 17B, 18B, 19B, 21B 22B and 23B define an intermediate surface 78 which extends between the base perimeters of the pyramidal surfaces 76 and 77.

The divergence of the sides of the pyramidal surface 76 away from the inlet corner 45 facilitates uniform and non-turbulent discharge of the test atmosphere into the exposure chamber 13 through the inlet conduit 44, as shown by the arrows in FIG. 3. Similarly, the convergence of the walls of the pyramidal surface 77 toward the outlet corner 47 thereof acts to facilitate uniform and non-turbulent convergence of the test atmosphere flowing to the outlet conduit 46. The intermediate surface 78 guides or contains the flow of the test atmosphere between the pyramidal surface 76 and the pyramidal surface 77. Accordingly, by locating the inlet conduit 44 and outlet conduit 46 in diagonally opposite corners of the cubical exposure chamber 13, the beneficial effects of the pyramidal surfaces are integrated into the chamber 13 without the necessity of a complex shape for the chamber which would increase its manufacturing cost and its size.

Figure 7:
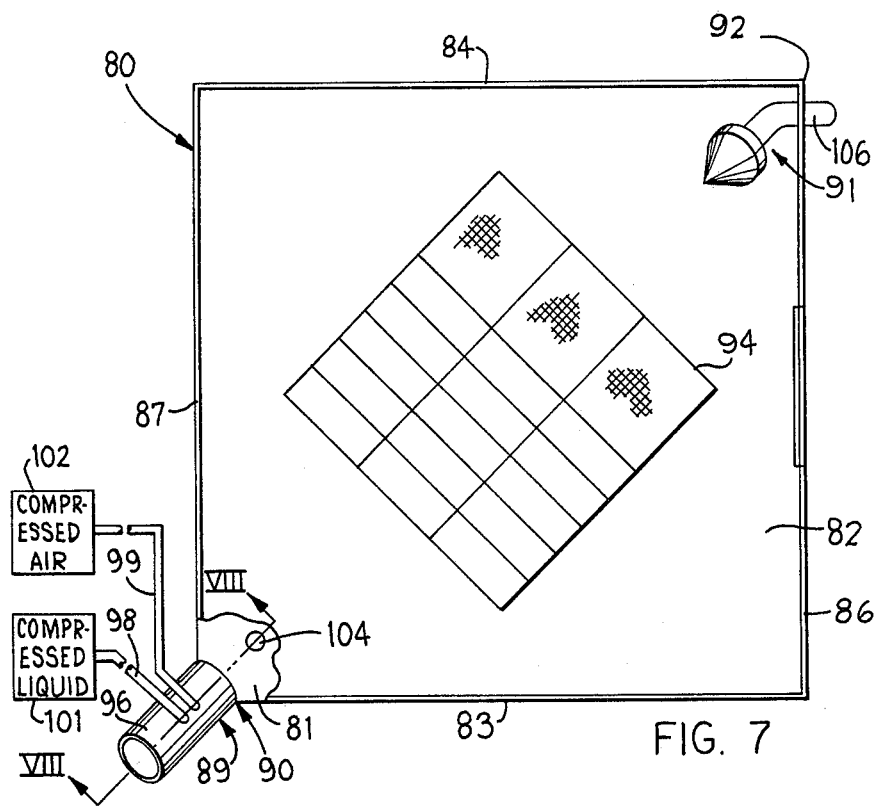
FIG. 7 is a top view, partially in section, of an alternative embodiment of an animal inhalation exposure apparatus incorporating the present invention.

FIG. 7 illustrates a modified exposure chamber 80 which is preferably substantially cubical and has a top wall 81, a bottom wall 82, a front wall 83, a rear wall 84, and side walls 86 and 87. The exposure chamber 80 is substantially larger than the exposure chamber 13, the edges thereof preferably being, for example only, approximately 6 feet long. The bottom wall 82 may be part of the floor of the room in which the chamber 80 is located.

An inlet assembly 89 (FIG. 8) is provided in an upper corner 90 of the chamber 80, and an outlet assembly 91 (FIG. 9) is provided adjacent the diagonally opposite and remote lower corner 92 of the chamber 80. A plurality of exposure cages 94 are positioned within the chamber 80, preferably stacked in offset horizontal tiers in the manner discussed hereinabove with respect to the cages 61 in FIGS. 2 and 3.

Figure 8:
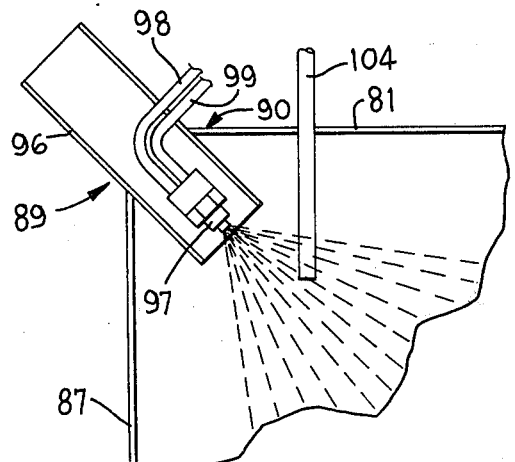
FIG. 8 is a sectional view taken along the line VIII—VIII of FIG. 7.
Figure 9:
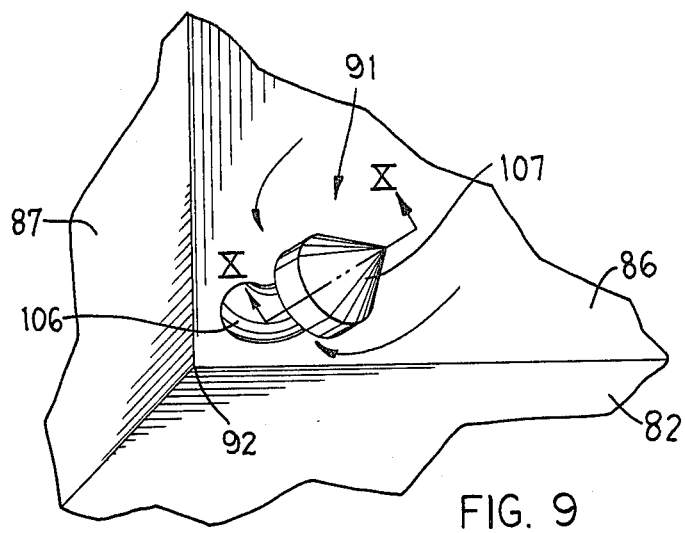
FIG. 9 is a perspective view of the outlet assembly shown in FIG. 7.

As shown in FIGS. 7 and 8, the inlet assembly 89 comprises an ambient air conduit 96, which is substantially coaxial with a line connecting the corners 90 and 92, and a nozzle 97 supported in the conduit 96 preferably coaxial therewith. A liquid conduit 98 and a compressed air conduit 99 respectively connect a pressurized liquid supply 101 and a compressed air supply 102 to the nozzle 97. The nozzle 97 may be a positive pressure spray nozzle of conventional construction and preferably has a wide dispersion angle, typically in the range of 60° to 70°. An aerosol delivery tube 104 extends down through the top wall 31 adjacent the corner 90 of the chamber 80 and has its lower end centrally disposed in the flow path of the spray from the nozzle 97. The other end of the delivery tube 104 is connected to an atmosphere generator, not shown, which is of conventional construction and may be identical to the atmosphere generator 35 of FIG. 1.

Where the bottom wall 82 (FIG. 9) of the exposure chamber 80 is part of the floor of the test chamber, the outlet assembly 91 comprises an outlet conduit 106 which extends a short distance into the chamber 80 through the side wall 86 adjacent the corner 92 and has a substantially conical deflector cap 107 covering the end thereof. The conduit 106 is preferably bent so that the axis of the conical cap 107 is preferably coincident with a line connecting the corners 90 and 92 of the chamber 80.

Figure 10:
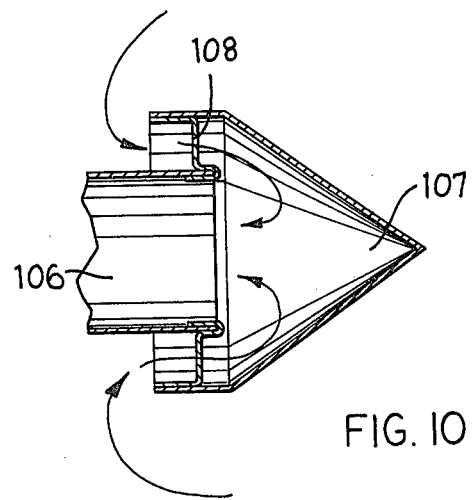
FIG. 10 is a sectional view taken along the line X—X in FIG. 9.

As shown in FIG. 10, the base portion of the conical cap 107 has a diameter substantially larger than the diameter of the inner end of the outlet conduit 106 and the cap 107 is supported on the outlet conduit 106 in a spaced, coaxial relationship by a plurality of metal clips 108 which extend radially between the conduit 106 and the cap 107. Side wall 86 has a door 85.

OPERATION

While the operations of the system 10 and the modified system are believed to be apparent from the foregoing descriptions thereof, such operations are summarized briefly hereinafter.

Referring to FIGS. 1 and 2, one or more test animals are placed in the exposure cages 61, and then the openings 36, 37, 38, 41 and 42 to the exposure chamber 13 and holding chamber 14 are tightly closed with the closure members 43.

The atmosphere generator 35 is energized and the valve 56 is adjusted so that the proper amount of gas is is moved through the flow meter 51. It has been found desirable to control the flow of test atmosphere through the chamber 13 so that volume of gas withdrawn through the outlet conduit 46 is in the range of approximately 6 to 8 C.F.M., as indicated by the flow meter 51. However, acceptable distribution of the gas through cages 61 can be effected within the range of 4 to 16 C.F.M. for the chamber 13 as described herein.

The vacuum source 54 preferably operates continuously and is capable of moving considerably more than 16 C.F.M. through the flow meter 51. Thus, in order to maintain a flow of ten cubic feet per minute, for example, the valve 56 is adjusted as required to furnish the additional volume of gas demanded by the exhaust source. Accordingly, if the volume of gas indicated by the flow meter 51 drops below an acceptable amount, the valve 56 can be closed, thereby forcing an increase in the gas flow through the meter 51. Such a situation can develop when the filtering unit becomes partially plugged with contaminants.

As the test atmosphere enters the exposure chamber 13 (FIGS. 3 and 5) through the inlet conduit 44, the pyramidal surface 76 will facilitate a uniform and non-turbulent divergence of the test atmosphere and, as shown by arrows in FIG. 3, the test atmosphere will flow substantially diagonally downwardly through the chamber 13 and, by virtue of the offset stacking of cages 61, will pass through the cages 61 with a minimal disturbance by the pans 62 of the general pattern of flow. Also, the contents of the test atmosphere will be distributed substantially uniformly through the plural cages. Thereafter, the pyramidal surface 77 (FIG. 5) will act to facilitate a uniform and non-turbulent convergence of the test atmosphere as it is drawn into the outlet conduit 46 at the corner 47 of the pyramidal surface 77. The test atmosphere will then pass through the pipe 48 to the filter 49 which will remove contaminents from the test atmosphere before it is drawn through the pipe 53 to the vacuum source 54.

After the test animals have been exposed to the test atmosphere, which is typically air carrying a toxic dust, in the exposure chamber 13 for the desired period of time, the closure members 43 for the openings 36, 37 and 41 are removed, as shown in FIG. 2, and a technician inserts his or her arms through the openings 37 and 41 and manually transfers the test animals from the exposure cages 61 in the exposure chamber 13 to the holding cages 59 in the holding chamber 14. During this transfer and at all other times, the vacuum source 54 preferably continues to operate in order to maintain a slight negative pressure within the exposure chamber 13 and within the housing 15, thereby ensuring that air will be drawn inwardly through the openings 36 and 37 and the cracks around the sliding doors 33 and 34 to minimize the possibility of escape of a portion of the toxic atmosphere from the exposure chamber 13 or the housing 15 into the holding chamber 14 or the room in which the exposure system 10 is located.

The operation of the alternative embodiment of the exposure system illustrated in FIGS. 7-10 is substantially the same as set forth hereinabove with respect to the embodiment of FIGS. 1-3, except for the differences specifically discussed hereinbelow.

Referring to FIG. 7, the withdrawal of the test atmosphere from the exposure chamber 80 through the outlet conduit 106 causes ambient air to be drawn into the exposure chamber 80 through the ambient air conduit 96. Alternatively or simultaneously, a pressurized liquid and/or compressed air may be supplied through the liquid inlet conduit 98 and the compressed air conduit 99 to the nozzle 97. Where the liquid is supplied with the compressed air, the nozzle produces atomized droplets in the form of a mist or fog. The liquid may be water to humidify the test atmosphere or may be a toxic liquid which is to be the subject matter of the exposure test. In addition, when the test animals have been removed from the exposure chamber 80 the liquid may be introduced through the nozzle 97 for the purpose of cleaning the chamber 80.

The aerosol delivery tube 104 introduces an aerosol, typically air laden with a toxic dust, into the center of the path of spray from the nozzle 97, whereby the aerosol is entrained in the mist or air sprayed from the nozzle 97 and becomes part of the test atmosphere.

The conical cap 107 on the outlet conduit 106 of the outlet assembly 91 prevents the test atmosphere from flowing directly into the conduit 106 and thereby converging prematurely in a somewhat turbulent fashion. Rather, the test atmosphere flows past the conical cap 107 and converges under the influence of the walls 82, 86 and 87 of the chamber 80, and then enters the outlet conduit 106 through the conical cap 107 in the manner illustrated by the arrows in FIG. 10. This results in a more uniform and non-turbulent convergence of the test atmosphere, and improves the wiping action of the test atmosphere along the walls 82, 86 and 87 to minimize the collection of toxic dust from the test atmosphere on such walls or in the corner 92.

Where the alternate chamber 80 is used, the volume of gas withdrawn through the outlet conduit 106 is preferably in the range of between about 28 and 32 C.F.M. However, acceptable results may be achieved with somewhat higher or lower volumes.

Although two preferred embodiments of the invention have been described in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An animal inhalation exposure apparatus for exposing test animals to a test atmosphere, comprising:

a substantially rectilinear boxlike exposure chamber having top, bottom, front and back walls and two opposed side walls, said exposure chamber having funnel-like first and second corner portions converging away from each other, said first funnel-like corner portion being defined by meeting of three of said walls, said second funnel-like corner portion being defined by meeting of the other three of said walls;

inlet means communicating with the interior of said chamber substantially at the apex of said first funnel-like corner portion;

a source of said test atmosphere connected to said inlet means;

outlet means communicating with the interior of said chamber substantially at the apex of said second funnel-like corner portion for the removal of said test atmosphere from said chamber, such that said inlet means and outlet means are about on a maximum length diagonal line across said rectilinear boxlike chamber between said apices, said inlet means and outlet means being remote from the central area and central edge portion of said walls; and means for effecting a flow of the test atmosphere through the interior of said chamber in a uniform and nonturbulent flow substantially along said diagonal line divergently from said first corner portion apex and convergently toward said second corner portion apex;

a generally planar array of animal cages several cages high and wide through which the mid portion of said diagonal line passes, said array extending transverse to said diagonal line in the widest portion of said enclosure where said oppositely converging first and second corner portions meet, said array of animal cages having a thickness, as measured along said diagonal line, which is small compared to the width and height of said array and which is small compared to the length of said diagonal line, such that the interior of said chamber along the major length of said diagonal line as measured inward from both ends thereof is free of obstructions to said flow, so as to enhance the uniform and nonturbulent nature of said flow through said interior of said chamber.

2. An apparatus according to claim 1, wherein said flow of said test atmosphere is at a plane angle of between 30 degrees and 60 degrees to said bottom wall as seen from the side of said chamber.

3. An apparatus according to claim 2, wherein said animal cages are arranged so that each cage is disposed in the path of said test atmosphere through said chamber and is exposed by line of sight to at least one of said first and second apices.

4. An apparatus according to claim 3, wherein said cages are stacked to define an acute angle to said bottom wall in the direction of the flow of said test atmosphere, such that the geometric centers of said cages lie substantially in a plane which is substantially perpendicular to said diagonal line.

5. An apparatus according to claim 4, including a substantially horizontal catch pan provided beneath each said cage.

6. An apparatus according to claim 1 wherein said first corner portion apex is defined by contiguous, triangular portions of said front wall, said top wall and one of said side walls; and said second corner portion apex is defined by contiguous, triangular portions of said rear wall, said bottom wall and the other of said side walls.

7. An apparatus according to claim 1, wherein said corner portions are separated by an intermediate portion including triangular sections of said top, bottom, front, rear and two side walls.

8. An apparatus according to claim 1, including wall means defining with one said wall a holding chamber contiguous with said exposure chamber;

said one wall having at least one opening therethrough communicating between said holding chamber and said exposure chamber; and closure means for closing said opening.

9. An apparatus according to claim 8, wherein said one wall and wall means have at least one arm opening through each thereof, such arm openings being near to each other; and closure means for closing said arm openings.

10. An apparatus according to claim 1, including a source of gas under pressure and means for conducting said gas to said inlet means and aimed in a direction substantially along said diagonal line toward said outlet means, and means protruding into said chamber at said inlet means and connected to said test atmosphere source for directing said test atmosphere into the path of said gas and for entraining thereby toward said outlet means.

11. The apparatus according to claim 1, wherein said outlet means comprises:

an outlet conduit which extends a short distance into said exposure chamber through the wall adjacent said apex of said second corner portion;

a substantially conical cap having an open base which is of greater diameter than the outlet conduit and which is spaced from and encircles the end of the outlet conduit inside said exposure chamber, the axis of said cap being substantially coincident with said diagonal line connecting said apices of said first and second corner portions; and means for supporting said cap on said outlet conduit in said spaced relationship.

12. The apparatus according to claim 1, including filter means cooperable with said outlet means for filtering toxic components from said test atmosphere after said test atmosphere exits said chamber.

13. The apparatus according to claim 1, including a housing supported on said exposure chamber and enclosing said source of said test atmosphere; and vacuum means communicating with said housing for maintaining a negative pressure within said housing.

14. The apparatus according to claim 1, wherein said means effecting a flow of said test atmosphere comprises a source of suction pressure connected to said outlet means.

15. The apparatus according to claim 14, including valve means for adjusting the rate at which said source of suction pressure withdraws said test atmosphere from said exposure chamber.

16. The apparatus according to claim 1, including a cart with casters which supports said exposure apparatus.

* * * * *

UNITED STATES PATENT AND TRADEMARK OFFICE
CERTIFICATE OF CORRECTION

PATENT NO. : 4 348 985
DATED : September 14, 1982
INVENTOR(S) : Basil K. J. Leong It is certified that error appears in the above—identified patent and that said Letters Patent is hereby corrected as shown below:

Column 6, line 52; change "31" to ---81---.

Signed and Sealed this

Eleventh Day of January 1983

[SEAL]

Attest:

GERALD J MOSSINGHOFF

Attesting Officer    Commissioner of Patents and Trademarks